(12) United States Patent
Takahashi et al.

(10) Patent No.: US 8,379,277 B2
(45) Date of Patent: Feb. 19, 2013

(54) ADJUSTING THE SPEED OF A SCANNER MOTOR IN AN IMAGE FORMING APPARATUS

(75) Inventors: Katsumi Takahashi, Toride (JP); Junichi Noguchi, Suzhou (CN)

(73) Assignee: Canon Kabushiki Kaisha (JP)

( * ) Notice: Subject to any disclaimer, the term of this patent is extended or adjusted under 35 U.S.C. 154(b) by 1199 days.

(21) Appl. No.: 11/736,642

(22) Filed: Apr. 18, 2007

(65) Prior Publication Data

US 2007/0242318 A1 Oct. 18, 2007

(30) Foreign Application Priority Data

Apr. 18, 2006 (JP) .................................. 2006-115009

(51) Int. Cl.
*H04N 1/04* (2006.01)
*B41J 27/00* (2006.01)
(52) U.S. Cl. ........................................ 358/487; 347/261
(58) Field of Classification Search .................. 358/487; 347/261
See application file for complete search history.

(56) References Cited

U.S. PATENT DOCUMENTS

2004/0119039 A1* 6/2004 Nierniro et al. ............. 251/129.2

FOREIGN PATENT DOCUMENTS

| JP | 09166907 | * | 6/1997 |
| JP | 10-003188 A | | 1/1998 |

* cited by examiner

*Primary Examiner* — Benny Q Tieu
*Assistant Examiner* — Eric A Rust
(74) *Attorney, Agent, or Firm* — Rossi, Kimms & McDowell LLP

(57) ABSTRACT

An image forming apparatus includes a scanner motor and a rotary polygonal mirror which is driven by the scanner motor to rotate, and reflects a modulated beam emitted from a light source by a plurality of reflection surfaces. The image forming apparatus includes a rotation and carrier unit which, while rotating, carries an image formed on the basis of a laser beam reflected by the rotary polygonal mirror, a speed detection unit which detects a rotation speed of the rotation and carrier unit. The image forming apparatus includes a tracking characteristic detection unit which detects a tracking delay of the scanner motor from a target rotation speed and a control unit which controls, on the basis of the rotation speed detected by the speed detection unit and a tracking characteristic detected by the tracking characteristic detection unit, a rotation speed of the scanner motor that drives the rotary polygonal mirror.

4 Claims, 16 Drawing Sheets

ADJUSTING THE SPEED OF A SCANNER MOTOR IN AN IMAGE FORMING APPARATUS

BACKGROUND OF THE INVENTION

1. Field of the Invention

The present invention relates to a scanner motor rotation control technique in an image forming apparatus.

2. Description of the Related Art

Color misregistration undesirably leads directly to degradation of the image quality in image forming apparatuses such as a color copying machine and color printer. The color misregistration is reduced by, for example, adjusting the position of the reflecting mirror in the optical path or the image write timing in accordance with the result obtained by reading a pattern formed on an intermediate transfer belt or convey belt.

However, this method alone cannot reduce expansion and contraction (distortion) of an image in the subscanning direction caused by periodic fluctuations of the speed due to the eccentricity (irregularity) of the photosensitive drum, thickness variations of the belt, the irregularity of the driving system, and the like. The expansion and contraction of an image also result in color misregistration. Note that the subscanning direction is rotation direction of the photosensitive drum.

To cancel periodic fluctuations of the photosensitive drum, belt, and the like, there is proposed a method of sequentially changing the rotation speed of the scanner motor (Japanese Patent Laid-Open No. 10-003188). More specifically, when the speeds of the photosensitive drum, belt, and the like are high, the scanner motor accelerates. When the speeds of the photosensitive drum, belt, and the like are low, the scanner motor decelerates. This can reduce expansion and contraction of an image in the subscanning direction.

However, the actual tracking characteristics of the scanner motor to a change of the target rotation speed are different between scanner motors. Even a single scanner motor gradually degrades its tracking characteristics with time in use.

If the scanner motor cannot track a change of the target rotation speed, neither expansion nor contraction of an image in the subscanning direction can be reduced.

SUMMARY OF THE INVENTION

The present invention provides an image forming technique capable of reducing expansion and contraction of an image in the subscanning direction even when the tracking characteristics of a scanner motor are not proper.

The present invention relates to an image forming apparatus including a scanner motor, a rotary polygonal mirror which is driven by the scanner motor to rotate, and reflects a modulated beam emitted from a light source by a plurality of reflection surfaces, and a rotation and carrier unit which, while rotating, carries an image formed on the basis of a laser beam reflected by the rotary polygonal mirror. The image forming apparatus further includes a speed detection unit which detects a rotation speed of the rotation and carrier unit, a tracking characteristic detection unit which detects a tracking delay of the scanner motor from a target rotation speed and a control unit which controls, on the basis of the rotation speed detected by the speed detection unit and a tracking characteristic detected by the tracking characteristic detection unit, a rotation speed of the scanner motor that drives the rotary polygonal mirror.

The present invention also relates to an image forming apparatus comprising a rotation and irradiation unit which emits a beam while rotating to form a developing material image corresponding to input image data, and a rotation and carrier unit which, while rotating, temporarily carries the developing material image to be transferred to a printing material. The image forming apparatus includes a fluctuation detection unit which detects periodic fluctuations of a rotation speed of the rotation and carrier unit in a subscanning direction, and a correction amount determination unit which determines a correction amount of a rotation speed of the rotation and irradiation unit so as to reduce expansion and contraction of an image on the printing material caused by the periodic fluctuations of the rotation speed. The image forming apparatus in particular includes a modification unit which modifies the correction amount in accordance with a tracking delay of the rotation and irradiation unit from a target rotation speed of a driving motor.

The image forming apparatus may also include a monitoring unit which monitors a tracking characteristic of the rotation and irradiation unit to the target rotation speed of the driving motor, and a notifying unit which outputs a notification when the tracking characteristic delays from a threshold. The image forming apparatus may also include a timing control unit which advances a timing when the correction amount is applied to the driving motor in accordance with a tracking delay when the tracking characteristic delays from the threshold.

Further features of the present invention will become apparent from the following description of exemplary embodiments with reference to the attached drawings.

DESCRIPTION OF THE EMBODIMENTS

Preferred embodiments of the present invention will be described below. Each of the following embodiments would help understand various concepts such as generic, specific, and more specific concepts of the invention. The technical scope of the present invention is defined by the scope of the claims, and is not limited by individual embodiments to be described below.

First Embodiment

Figure 1:
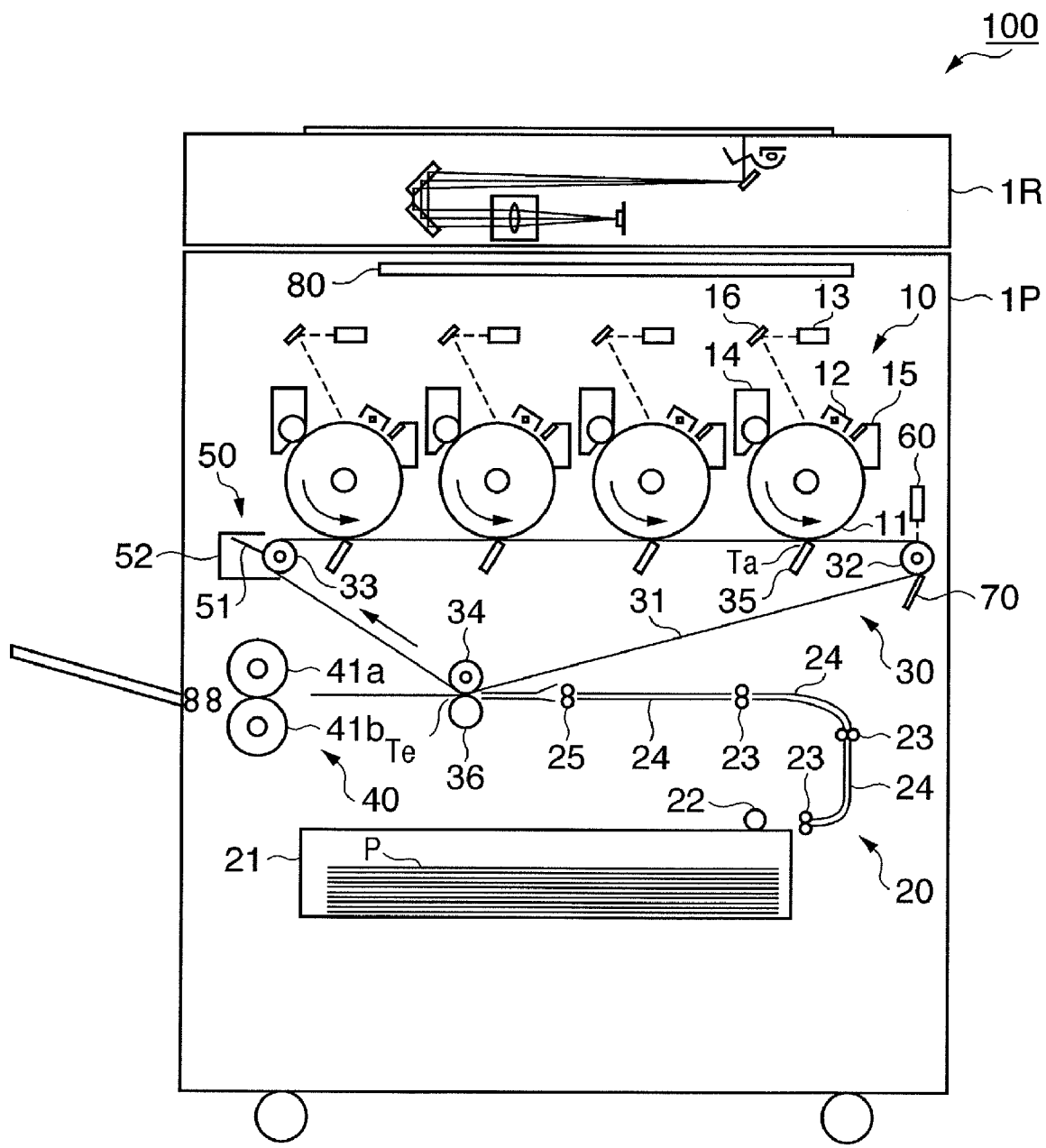
FIG. 1 is a schematic sectional view showing the whole arrangement of an image forming apparatus according to the first embodiment.

FIG. 1 is a schematic sectional view showing the whole arrangement of an image forming apparatus according to the first embodiment. An image forming apparatus 100 is an electrophotographic color copying machine. The image forming apparatus 100 has a plurality of tandem image forming units 10 and adopts the intermediate transmit method. The present invention is also applicable to a monochrome image forming apparatus. The present invention is applicable not only to the copying machine, but also to a printer, multifunctional peripheral, facsimile machine, or the like.

The image forming apparatus 100 comprises an image reading section 1R and image output section 1P. The image reading section 1R optically reads a document image, converts it into an electrical signal, and transmits the electrical signal to the image output section 1P. The image output section 1P comprises four tandem image forming units 10, a feeding unit 20, an intermediate transfer unit 30, a fixing unit 40, cleaning units 50 and 70, a photosensor 60, and a control unit 80. The photosensor 60 functions as a fluctuation detection unit which detects periodic fluctuations of the rotation speed of a rotation and carrier unit such as an intermediate transfer belt in the subscanning direction. Note that the subscanning direction is rotation direction of the photosensitive drum and/or the intermediate transfer belt (indicated by arrow in FIG. 1).

In each image forming unit 10, a photosensitive drum 11 serving as an image carrier which bears an electrostatic latent image and developing material image is axially supported rotatably, and is driven to rotate in a direction indicated by an arrow. The photosensitive drum 11 is an example of the rotation and carrier unit which, while rotating, temporarily carries a developing material image to be transferred to a printing material. A primary charger 12, optical system 13, reflecting mirror 16, developing device 14, and cleaning device 15 are arranged around each photosensitive drum 11. The optical system 13 is an example of a rotation and irradiation unit which emits a beam while rotating to form a developing material image corresponding to input image data.

The feeding unit 20 comprises a cassette 21 for storing printing materials P, a pickup roller 22 for feeding printing materials P one by one, feeding roller pairs 23 for conveying the printing material P, and a feeding guide 24. The feeding unit 20 further comprises registration rollers 25 for supplying the printing material P to a secondary transfer area Te in synchronism with the image forming timing of each image forming unit 10.

The intermediate transfer unit 30 will be explained in detail. An intermediate transfer belt 31 is an example of the rotation and carrier unit which, while rotating, temporarily carries a developing material image to be transferred to a printing material. The intermediate transfer belt 31 is looped and wound between a driving roller 32 which transmits a driving force to the intermediate transfer belt 31, a driven roller 33 serving as a tension roller which applies a proper tension to the intermediate transfer belt 31, and a secondary transfer counter roller 34. A pulse motor (not shown) drives and rotates the driving roller 32.

A primary transfer charger 35 is arranged below the intermediate transfer belt 31 in a primary transfer area Ta where each photosensitive drum 11 faces the intermediate transfer belt 31. The secondary transfer counter roller 34 faces a secondary transfer roller 36.

The cleaning unit 50 for cleaning the image forming surface of the intermediate transfer belt 31 is provided downstream of the secondary transfer area Te of the intermediate transfer belt 31. The cleaning unit 50 comprises a cleaning blade 51 for removing toner from the intermediate transfer belt 31, and a disposal toner box 52 for storing disposed toner.

The cleaning unit 70 is arranged for the driving roller 32 of the intermediate transfer belt 31. The cleaning unit 70 comprises a cleaning blade, and a pulse motor (not shown) for moving the cleaning blade apart from the intermediate transfer belt 31. The cleaning unit 70 removes toner (pattern 61 or 62 to be described later) from the transfer belt 31.

The fixing unit 40 comprises a fixing roller 41a which incorporates a heat source such as a halogen heater, and a press roller 41b pressed against the fixing roller.

The control unit 80 comprises a CPU for controlling the operation of each unit, a storage device, a registration correcting circuit, a motor driver (rotation control circuit 804 to be described later), and the like. The control unit 80 determines the correction amount of the rotation speed of the rotation and irradiation unit (e.g., optical system 13) in order to reduce, for example, expansion and contraction of an image on a printing material caused by detected periodic fluctuations of the rotation speed. The control unit 80 corrects/modifies the correction amount in accordance with the tracking delay of the rotation and irradiation unit from the target rotation speed of the driving motor. In accordance with the tracking delay, the control unit 80 may advance the timing when the correction amount is applied. The control unit 80 may notify the operator that the tracking delay occurred.

[Registration Correction]

Figure 2:
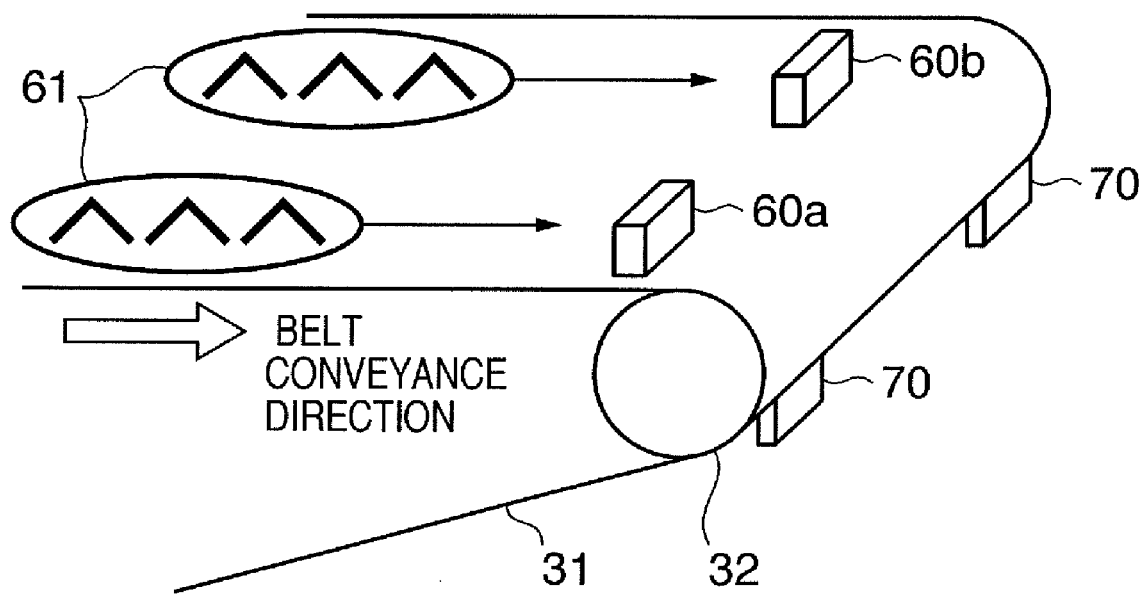
FIG. 2 is a view for explaining registration correction according to the first embodiment.

FIG. 2 is a view for explaining registration correction according to the first embodiment. Registration correction to correct color misregistration of a color image will be explained with reference to FIG. 2.

The photosensor 60 comprises a first sensor 60a and second sensor 60b. As is apparent from FIG. 1, the photosensor 60 is interposed between the driving roller 32 and the photosensitive drum 11 positioned most downstream in the belt moving direction among a plurality of photosensitive drums. As shown in FIG. 2, the photosensor 60 reads the registration correction pattern 61 formed on the intermediate transfer belt 31.

In the first embodiment, the image forming unit 10 forms the pattern 61 on the intermediate transfer belt 31 at a predetermined timing, and the photosensor 60 reads it. The image forming apparatus 100 detects misregistration on a photosensitive drum corresponding to each color. The image forming apparatus 100 electrically corrects an image signal, or corrects the optical path length or the like by driving the reflecting mirror 16 so as to cancel the misregistration.

[Concept of Image Expansion/Contraction Reduction Process]

As described above, registration correction alone cannot correct expansion and contraction of an image and color misregistration in the subscanning direction caused by the irregularity of the photosensitive drum 11, thickness variations of the intermediate transfer belt 31, the irregularity of the driving system, and the like.

Figure 3:
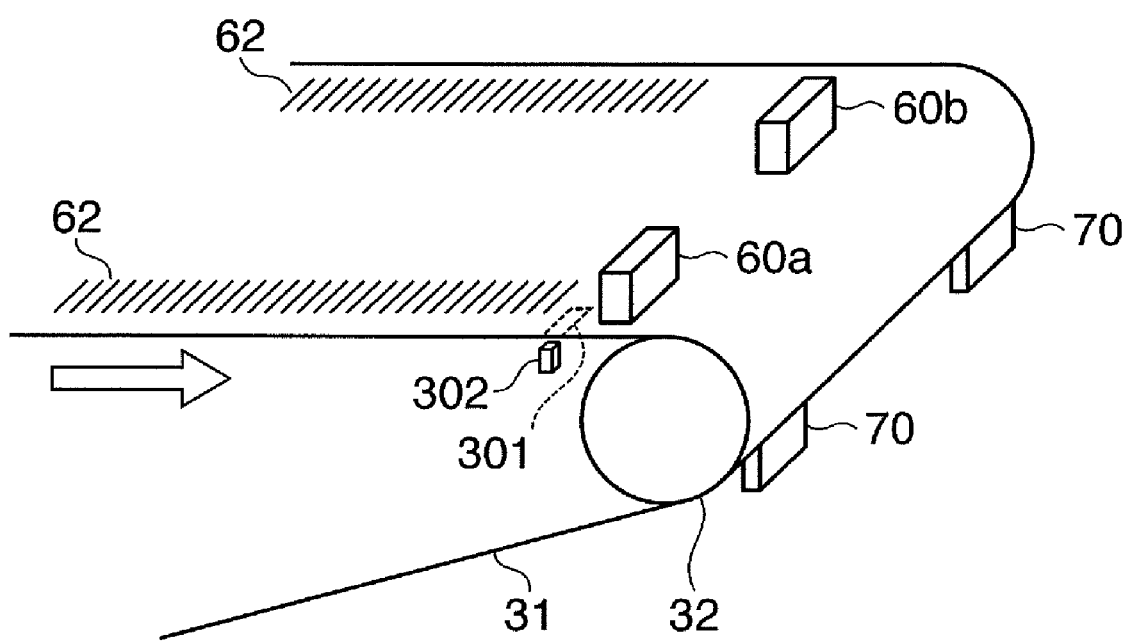
FIG. 3 is a view for explaining image expansion/contraction correction according to the first embodiment.

FIG. 3 is a view for explaining an image expansion/contraction reduction process according to the first embodiment. As shown in FIG. 3, the image forming unit 10 forms, on the intermediate transfer belt 31 in a single rotation (or revolution), a pattern (expansion and contraction correction pattern 62) for correcting expansion and contraction in the subscanning direction. The photosensor 60 reads the formed expansion and contraction correction pattern 62. That is, the photosensor 60 reads the registration correction pattern 61 and expansion and contraction correction pattern 62.

Based on the result of reading the expansion and contraction correction pattern 62, the control unit 80 obtains expansion and contraction in the subscanning direction when the intermediate transfer belt 31 rotates once. The expansion and contraction correction pattern 62 is formed by only one rotation of the belt because the image expansion/contraction period corresponds to one rotation of the intermediate transfer belt.

In the first embodiment, a mark 301 serving as a reference position is formed on the lower surface of the intermediate transfer belt 31 in order to determine the reference position of the expansion and contraction correction pattern 62 corresponding to one round of the belt. The mark 301 is identifiable optically, electrically, or magnetically. The control unit 80 uses a mark detection sensor 302 to detect the mark 301. The image forming unit 10 forms the expansion and contraction (detection) correction pattern 62 on the intermediate transfer belt 31 with a typical color (e.g., magenta) among yellow, cyan, magenta, and black using the position of the mark 301 as a reference position.

The color used to form the expansion and contraction correction (detection) pattern 62 is not limited to magenta in the first embodiment. A preferable color is selected in accordance with the characteristics of the intermediate transfer belt 31 and photosensor 60. The pattern detection precision is considered to increase by selecting the color in accordance with these characteristics. Selecting a color toner of a large remaining amount would avoid stop of image formation caused by the absence of toner.

Figure 4A:
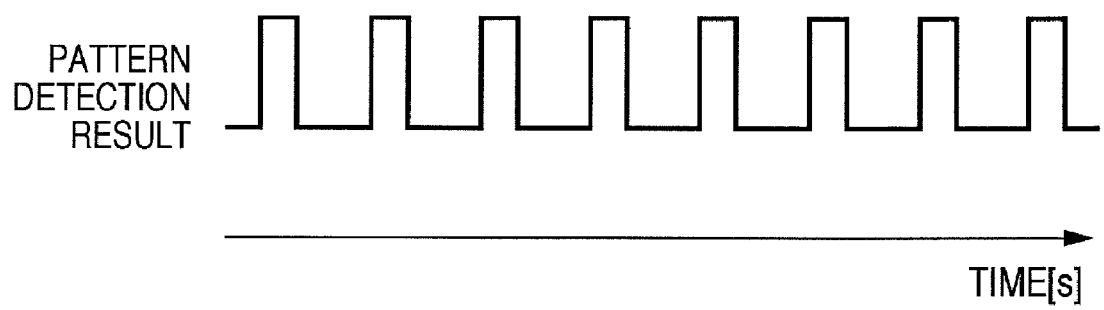
FIGS. 4A and 4B are timing charts showing examples of the result of reading an expansion and contraction correction pattern according to the first embodiment.
Figure 4B:
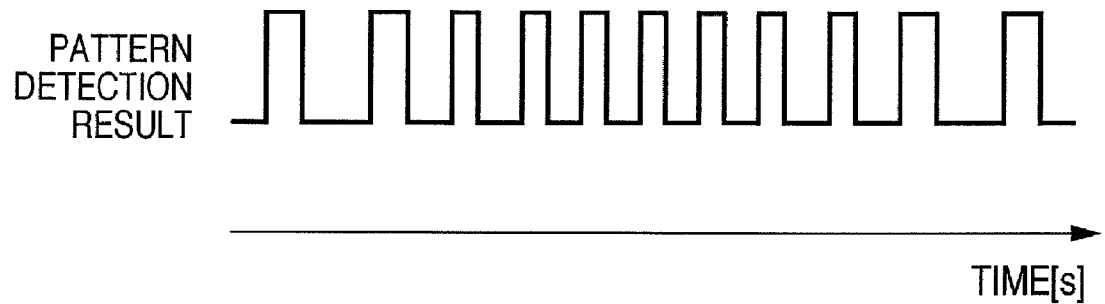

FIGS. 4A and 4B are timing charts showing examples of the result of reading the expansion and contraction correction pattern according to the first embodiment. FIG. 4A shows a detection result output from the photosensor 60 in an ideal state free from any expansion and contraction of an image in the subscanning direction. As is apparent from FIG. 4A, the detection result is given by pulse signals at equal intervals.

FIG. 4B shows a detection result output from the photosensor 60 when the rotation speed fluctuates due to the irregularity of the photosensitive drum, thickness variations of the transfer belt, the irregularity of the driving system, and the like. As is apparent from FIG. 4B, the interval between pulses changes periodically.

Figure 5:
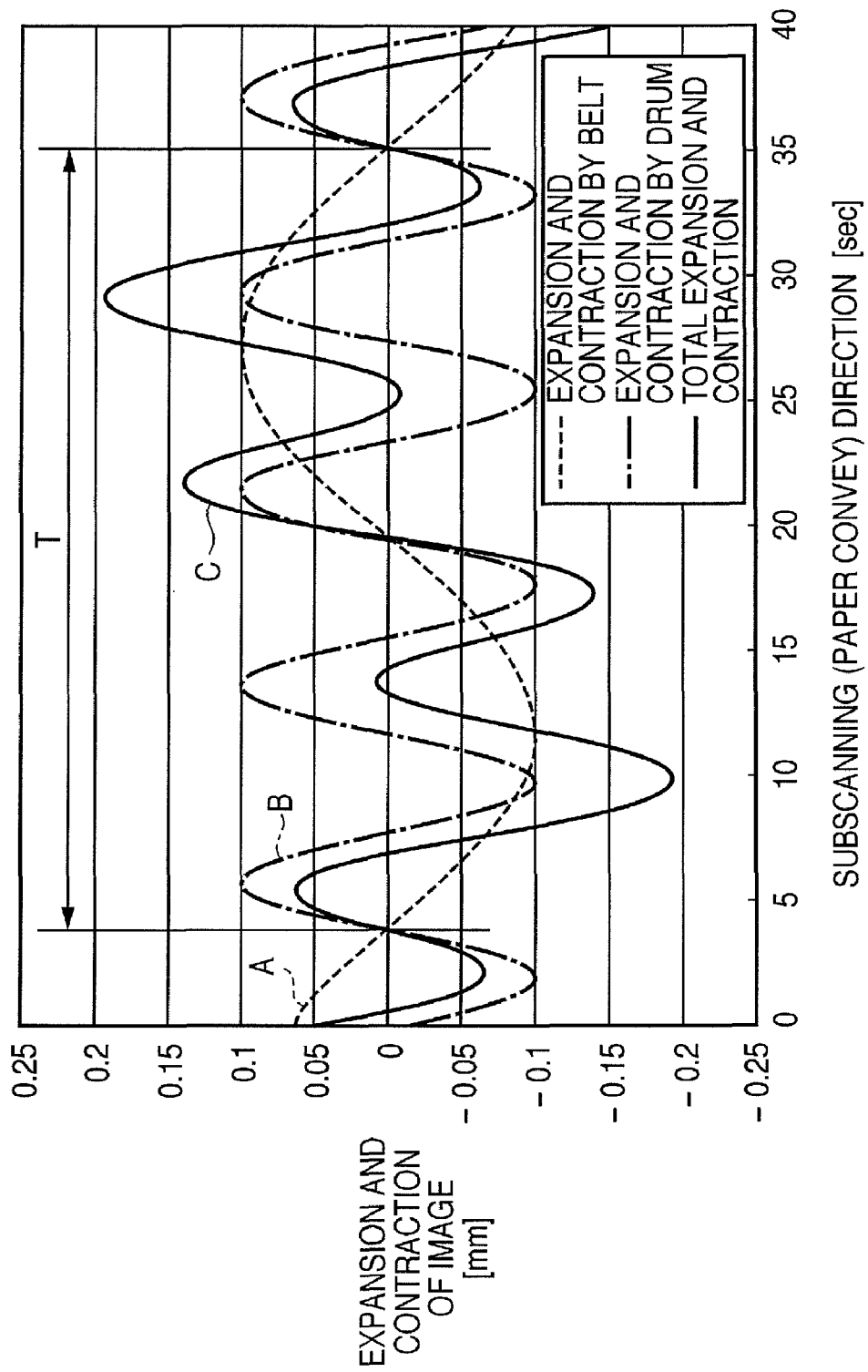
FIG. 5 is a graph showing the relationship between the time and expansion and contraction of an image in the subscanning direction on the basis of the detection result shown in FIG. 4B.

FIG. 5 is a graph showing the relationship between the time and expansion and contraction of an image in the subscanning direction on the basis of the detection result shown in FIG. 4B. Broken line A represents expansion and contraction caused by thickness variations of the intermediate transfer belt 31, the irregularity of the driving system, and the like. Broken line A will also be referred to as expansion/contraction A. Chain line B represents expansion and contraction caused by the irregularity of the photosensitive drum 11, and the like. Chain line B will also be referred to as expansion/contraction B. Solid line C represents total expansion and contraction in the subscanning direction. Solid line C will also be referred to as expansion/contraction C. Expansion/contraction C is the sum of expansion/contraction A and expansion/contraction B. Expansion/contraction C is expansion and contraction of an image on a printing material.

Total expansion/contraction C in the subscanning direction repeats itself in the period T. T corresponds to the time necessary for the intermediate transfer belt 31 to go round once. This is because the peripheral length of the intermediate transfer belt 31 is designed to be an integer multiple of the peripheral length of the photosensitive drum 11.

In FIG. 5, a positive image expansion/contraction value means that the rotation speed (peripheral speed) of the intermediate transfer belt 31 in the subscanning direction is higher than an ideal value. In other words, the interval of the expansion and contraction correction pattern 62 on the intermediate transfer belt 31 is relatively small. A negative image expansion/contraction value means that the peripheral speed of the intermediate transfer belt 31 in the subscanning direction is lower than the ideal value. In other words, the interval of the expansion and contraction correction pattern 62 on the intermediate transfer belt 31 is relatively large.

To reduce the periodic expansion and contraction of an image, the rotation speed of the scanner motor is desirably corrected to reduce the expansion and contraction of an image on the basis of the interval of the read expansion and contraction correction pattern 62 of one period. The correction amount at this time is so determined as to reduce expansion and contraction of an image.

Figure 6:
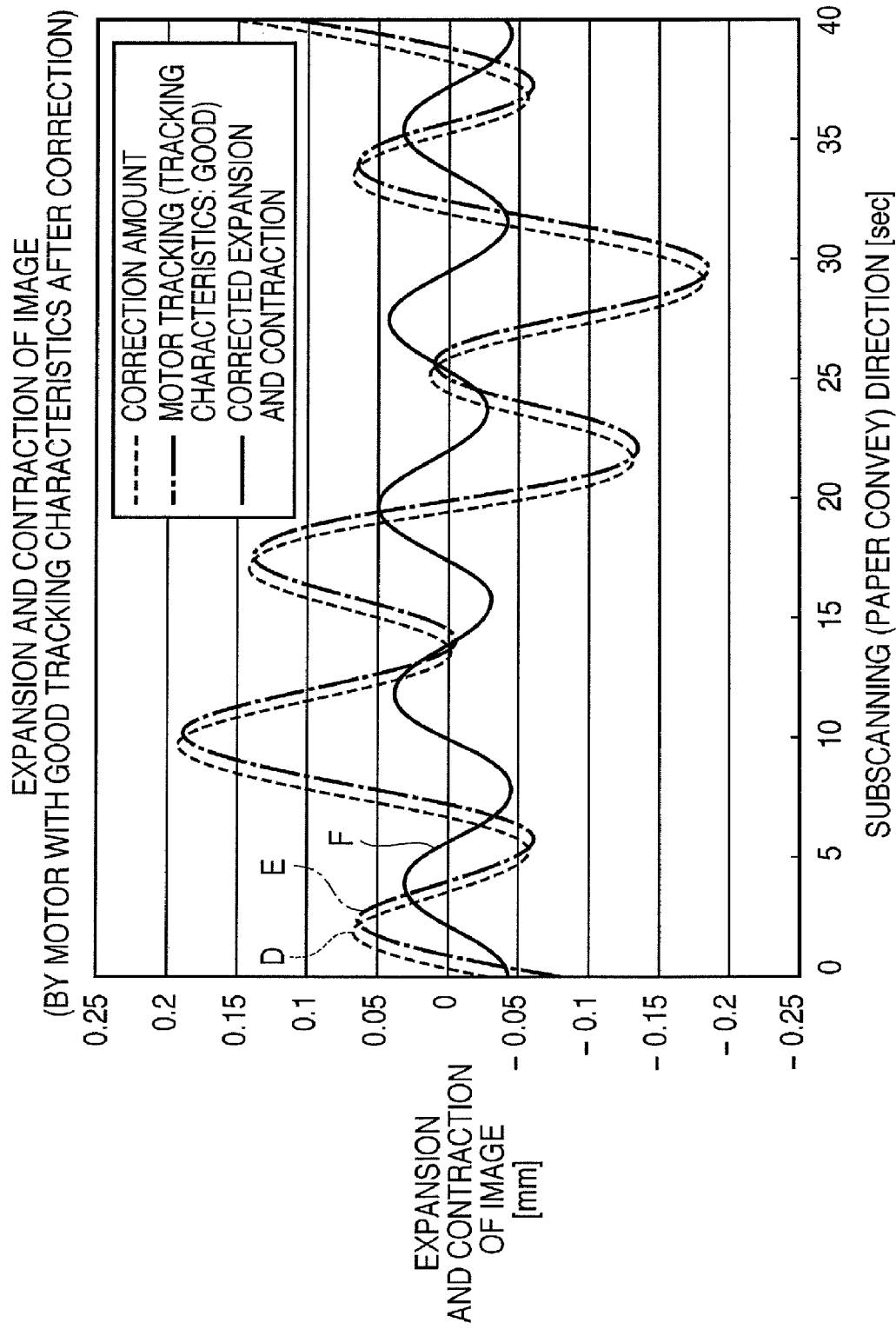
FIG. 6 is a graph for explaining correction of expansion and contraction of an image in the use of a scanner motor with good tracking characteristics.

FIG. 6 is a graph for explaining correction of expansion and contraction of an image in the use of a scanner motor with good tracking characteristics. Broken line D represents the correction amount of the rotation speed of the scanner motor that is so determined as to reduce expansion and contraction of an image in the subscanning direction. Broken line D will also be referred to as correction amount D. As is apparent from a comparison with FIG. 5, a series of correction amounts D are opposite in phase to expansion/contraction C. The control unit 80 determines a series of correction amounts D so as to cancel expansion and contraction of an image in the subscanning direction. The control unit 80 controls the rotation speed of the scanner motor on the basis of correction amount D.

When correction amount D takes a positive value, the control unit 80 controls the rotation speed of the scanner motor to be higher than the normal speed. When correction amount D takes a negative value, the control unit 80 controls the rotation speed to be lower than the normal speed. As the absolute value of the correction amount increases, the change amount of the rotation speed also increases. The rotation speed of the scanner motor is controlled in accordance with the correction amount at the timing when correction becomes necessary, e.g., during image formation.

It is known that rotation of the scanner motor responds to a driving signal with a delay in practice. This delay makes an actual correction amount as represented by chain line F. Chain line E will also be referred to as correction amount E.

Solid line F shows image expansion/contraction corrected with correction amount E. Solid line F will also be referred to as corrected image expansion/contraction F. Corrected image expansion/contraction F is obtained by adding correction amount E to image expansion/contraction C before correction shown in FIG. 5. As is apparent from FIG. 5, image expansion/contraction C before correction occurs by about ±0.2 mm. To the contrary, corrected image expansion/contraction F reduces to about ±0.05 mm. In this fashion, good tracking characteristics (response characteristics) of the scanner motor can preferably reduce expansion and contraction of an image.

Figure 7:
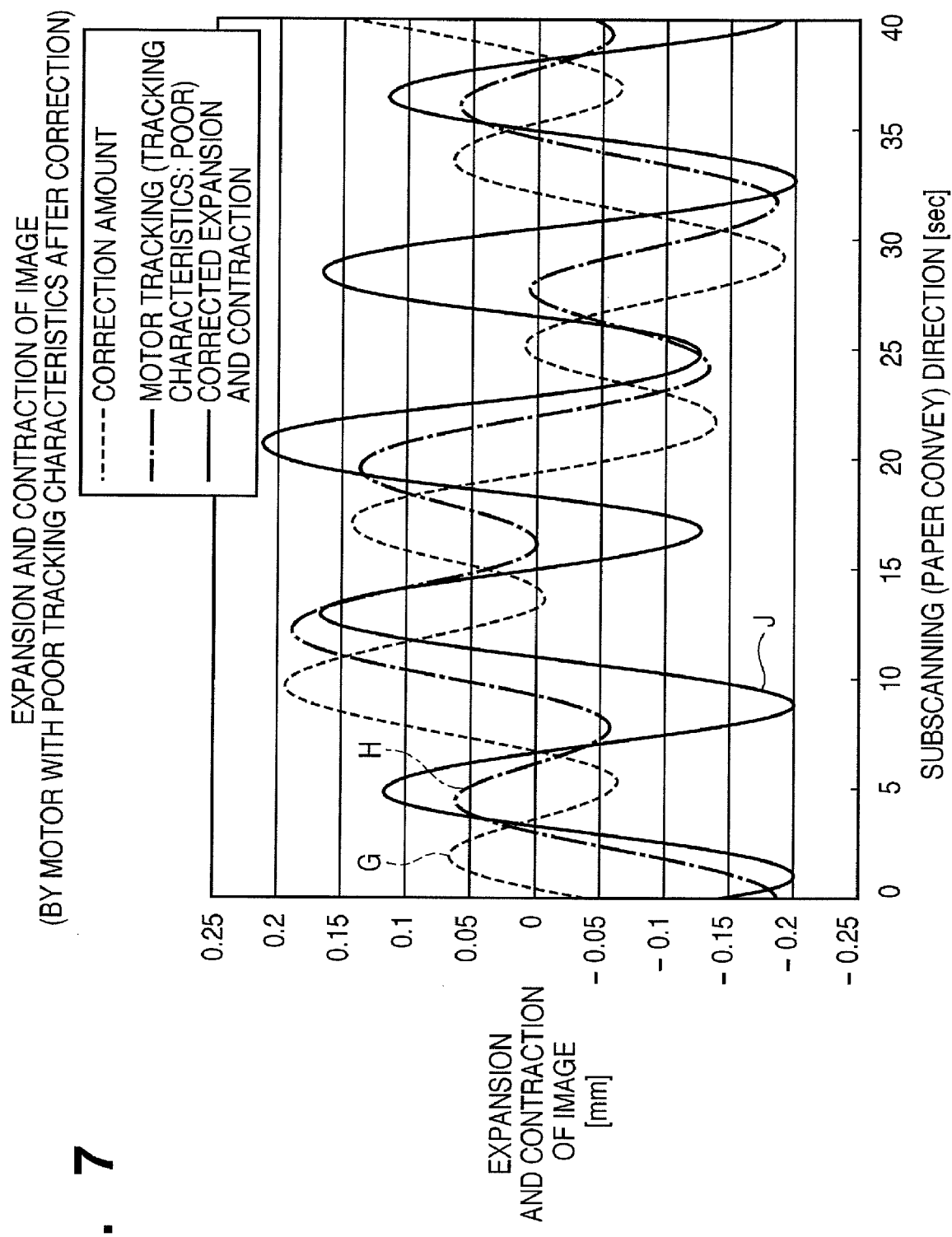
FIG. 7 is a graph for explaining correction of expansion/contraction of an image in the use of a scanner motor with poor tracking characteristics.

FIG. 7 is a graph for explaining the image expansion/contraction reduction process in the use of a scanner motor with poor tracking characteristics. As described above, the scanner motor is sometimes poor in tracking characteristics depending on the individual difference or the degree of consumption. In FIG. 7, broken line G represents the correction amount of the rotation speed of the scanner motor, similar to correction amount D shown in FIG. 6. Broken line G will also be referred to as correction amount G.

The rotation speed of the scanner motor is controlled in accordance with correction amount G. However, when the tracking characteristics of the scanner motor are not satisfactory, the actual correction amount becomes as represented by broken line H. Broken line H will also be referred to as correction amount H. The sum of correction amount H and image expansion/contraction C is corrected image expansion/contraction J (solid line). As is apparent from FIG. 7, corrected image expansion/contraction J is worse than image expansion/contraction C shown in FIG. 5.

For this reason, the control unit 80 according to the first embodiment controls the rotation speed of the scanner motor using an image expansion/contraction correction amount determined in accordance with the tracking characteristics of the scanner motor. This can preferably reduce expansion and contraction of an image even if the tracking characteristics of the scanner motor are poor. That is, the first embodiment can at least avoid a situation in which correction worsens expansion and contraction of an image owing to poor tracking characteristics.

Figure 8:
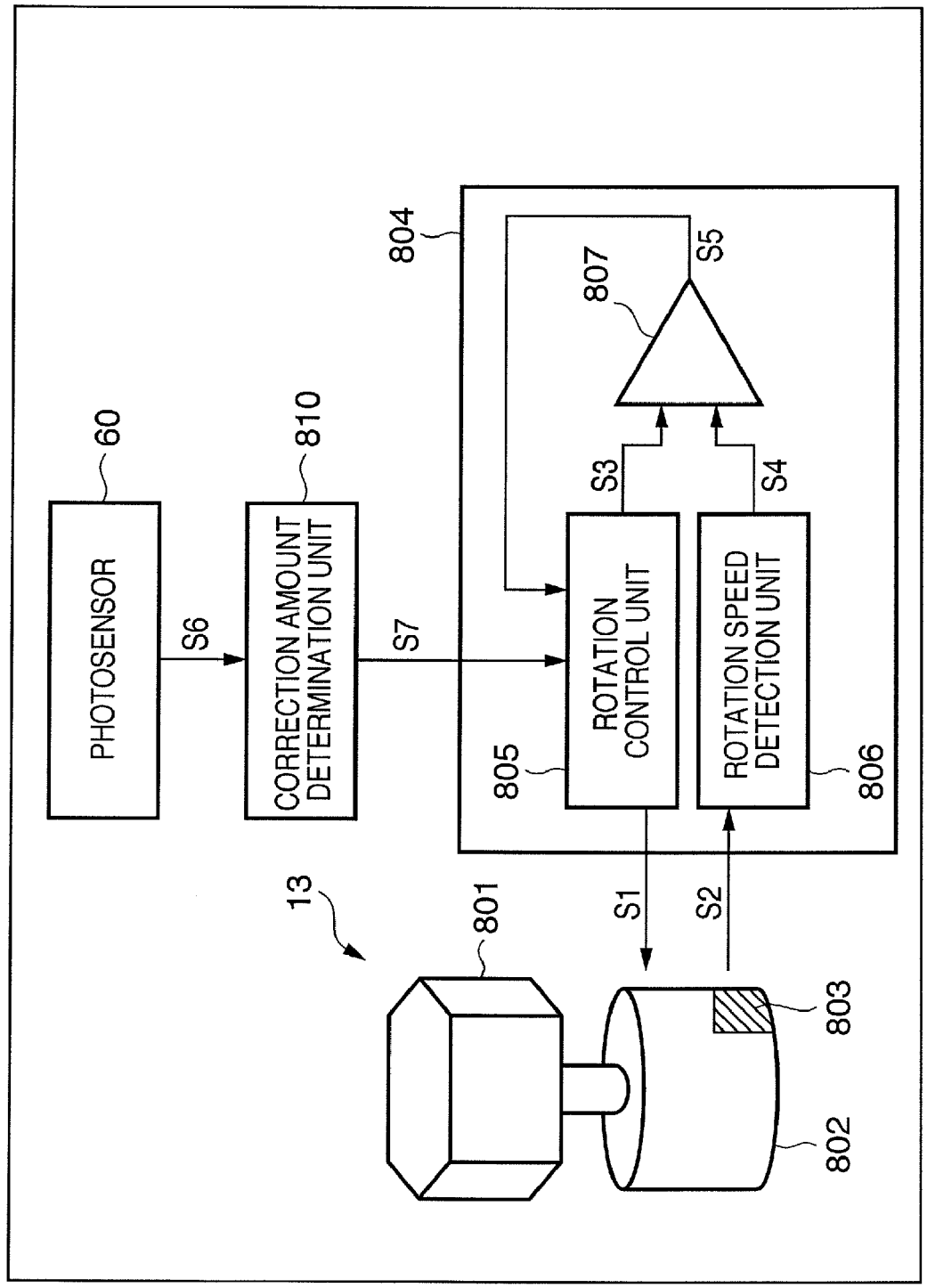
FIG. 8 is a view for explaining a scanner motor control circuit in a control unit.

FIG. 8 is a view for explaining a scanner motor control circuit in the control unit. Reference numeral 801 denotes a rotary polygonal mirror which reflects a beam emitted from a laser (not shown). Reference numeral 802 denotes a scanner motor which drives the polygonal mirror 801. Reference numeral 803 denotes a rotation speed sensor which detects the rotation speed of the scanner motor 802.

Reference numeral 804 denotes the rotation control circuit of the scanner motor. The rotation control circuit 804 comprises a rotation control unit 805 which supplies the rotation control signal S1 to the scanner motor 802, and a rotation speed detection unit 806 which receives the rotation detection signal S2 output from the rotation speed sensor 803.

The rotation control circuit 804 further comprises a tracking characteristic detection unit 807. The tracking characteristic detection unit 807 detects an actual tracking delay from the rotation control signal (target value) S1 by comparing the rotation control signal S3 (which may be identical to S1) output from the rotation control unit 805 with the rotation detection signal S4 (which may be identical to S2) output from the rotation speed detection unit 806. The tracking characteristic detection unit 807 functions as a monitoring unit which monitors tracking characteristics to the target rotation speed of the scanner motor 802.

The detection result S5 output from the tracking characteristic detection unit 807 is fed back to the rotation control unit 805. The rotation control unit 805 controls the speed of the scanner motor 802 in consideration of the detection result S5.

The rotation control unit 805 receives a series of correction amounts S7 determined by a correction amount determination unit 810. The correction amount determination unit 810 receives information (read result S6 of the expansion and contraction correction pattern 62) on periodic fluctuations of the rotation speed that is output from the photosensor 60. The correction amount determination unit 810 determines the correction amount of the rotation speed of the scanner motor 802 so as to reduce expansion and contraction of an image. The rotation control unit 805 controls the rotation speed of the scanner motor 802 in accordance with the correction amount S7 determined by the correction amount determination unit 810.

Figure 9:
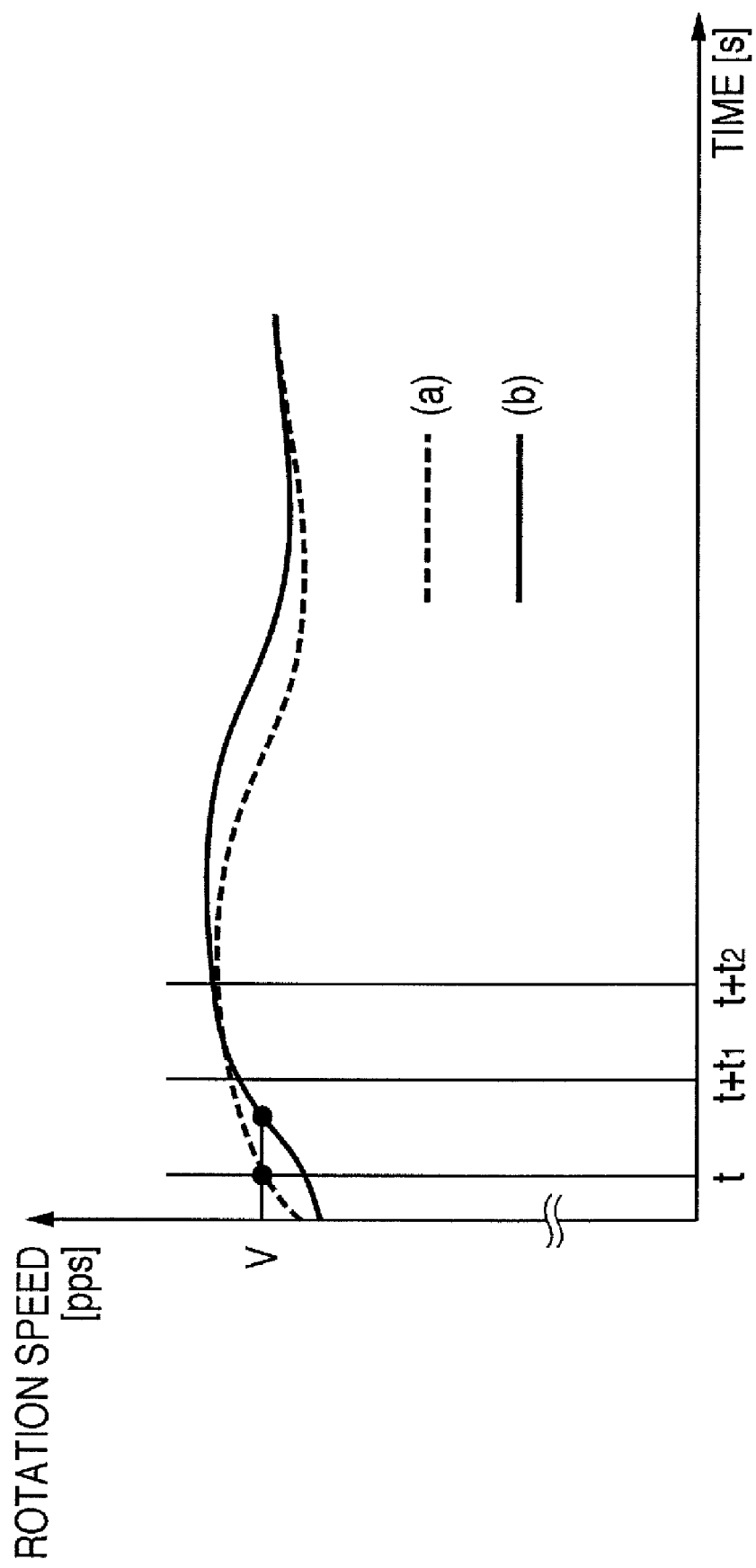
FIG. 9 is a graph for explaining a method of detecting the tracking characteristics of the scanner motor according to the first embodiment.

FIG. 9 is a graph for explaining the method of detecting the tracking characteristics of the scanner motor according to the first embodiment. Broken line (a) represents the target rotation speed of the scanner motor. Broken line (a) will also be referred to as target rotation speed (a) or speed control signal (a). The target rotation speed corresponds to the speed control signal S3. Solid line (b) represents an actual rotation speed. Solid line (b) will also be referred to as actual rotation speed (b). The actual rotation speed corresponds to the rotation detection signal S4.

The rotation control unit 805 sets the target rotation speed at control start time t [s (seconds)] to V [pps (pulses per second)], and starts rotation speed control. The rotation control unit 805 determines whether the actual rotation speed has reached V [pps] upon the lapse of the first control time t1 from t and the second control time t2 later than the first control time t1.

If actual rotation speed (b) has reached target rotation speed (a) corresponding to the speed control signal S3 after t1, the tracking characteristics of the scanner motor are good. Thus, expansion and contraction of an image are preferably reduced as represented by solid line F in FIG. 6. The rotation control unit 805 controls the rotation speed of the scanner motor 802 in accordance with the correction amount determined by the correction amount determination unit 810. The controlled rotation speed as represented by solid line F means that expansion and contraction of an image are reduced.

If no actual rotation speed has reached target rotation speed (a) corresponding to the speed control signal S3 after t1, speed control by the rotation control unit 805 with the same correction amount D worsens expansion and contraction of an image (solid line J in FIG. 7). Hence, when the scanner motor has a tracking delay, the rotation control unit 805 must modify the correction amount in accordance with the delay.

Figure 10:
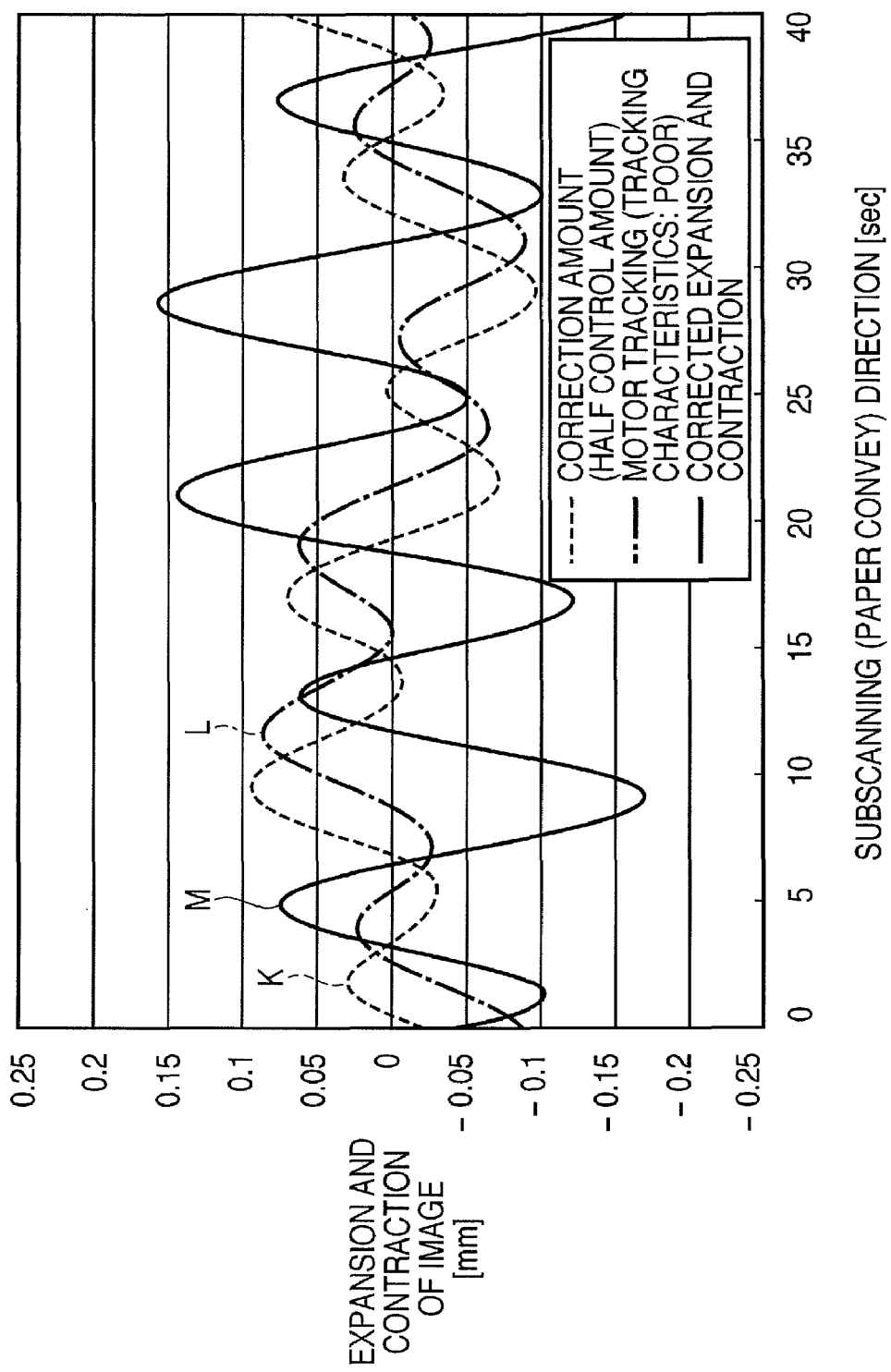
FIG. 10 is a graph showing an example of modifying the correction amount and controlling the speed of a scanner motor with poor tracking characteristics.

FIG. 10 is a graph showing an example of modifying the correction amount and controlling the speed of a scanner motor with poor tracking characteristics. In this example, the rotation control unit 805 sets the image expansion/contraction correction amount of a scanner motor with poor tracking characteristics to be smaller than that of a scanner motor with good tracking characteristics. For example, the rotation control unit 805 modifies the correction amount by multiplying a normal correction amount applied to a scanner motor with good tracking characteristics by a modification coefficient of less than 1. In the example of FIG. 10, the modification coefficient is set to 0.5 to halve the correction amount (broken line K).

In practice, the target correction amount is modified to a correction amount represented by chain line L due to the tracking delay. Chain line L will also be referred to as correction amount L. Final image expansion/contraction M is obtained by adding correction amount L to image expansion/contraction C before correction shown in FIG. 5.

As shown in FIG. 5, image expansion/contraction C before correction occurs by about ±0.2 mm. By applying a modified correction amount to a scanner motor with poor tracking characteristics, image expansion/contraction can be reduced to about ±0.15 mm (solid line M in FIG. 10). Correction with the modified correction amount does not worsen expansion and contraction of an image, unlike solid line J in FIG. 7.

Even after t2, the actual rotation speed (b) may not have reached target rotation speed (speed control signal (a)). In this case, the rotation control unit 805 may employ a modification coefficient smaller than that applied at t1. The rotation control unit 805 may control the speed to make the rotation speed of the scanner motor constant by setting the modification coefficient to 0 ultimately. This is because when no rotation speed has reached the target speed even after t2, corrected image expansion/contraction may become worse than image expansion/contraction before correction even by modifying the correction amount. In a case in which no reduction of image expansion/contraction is expected even by correcting the rotation speed of the scanner motor, the rotation control unit 805 desirably inhibits the reduction process and controls the scanner motor to a constant rotation speed.

[Control Flowchart 1]

Figure 11:
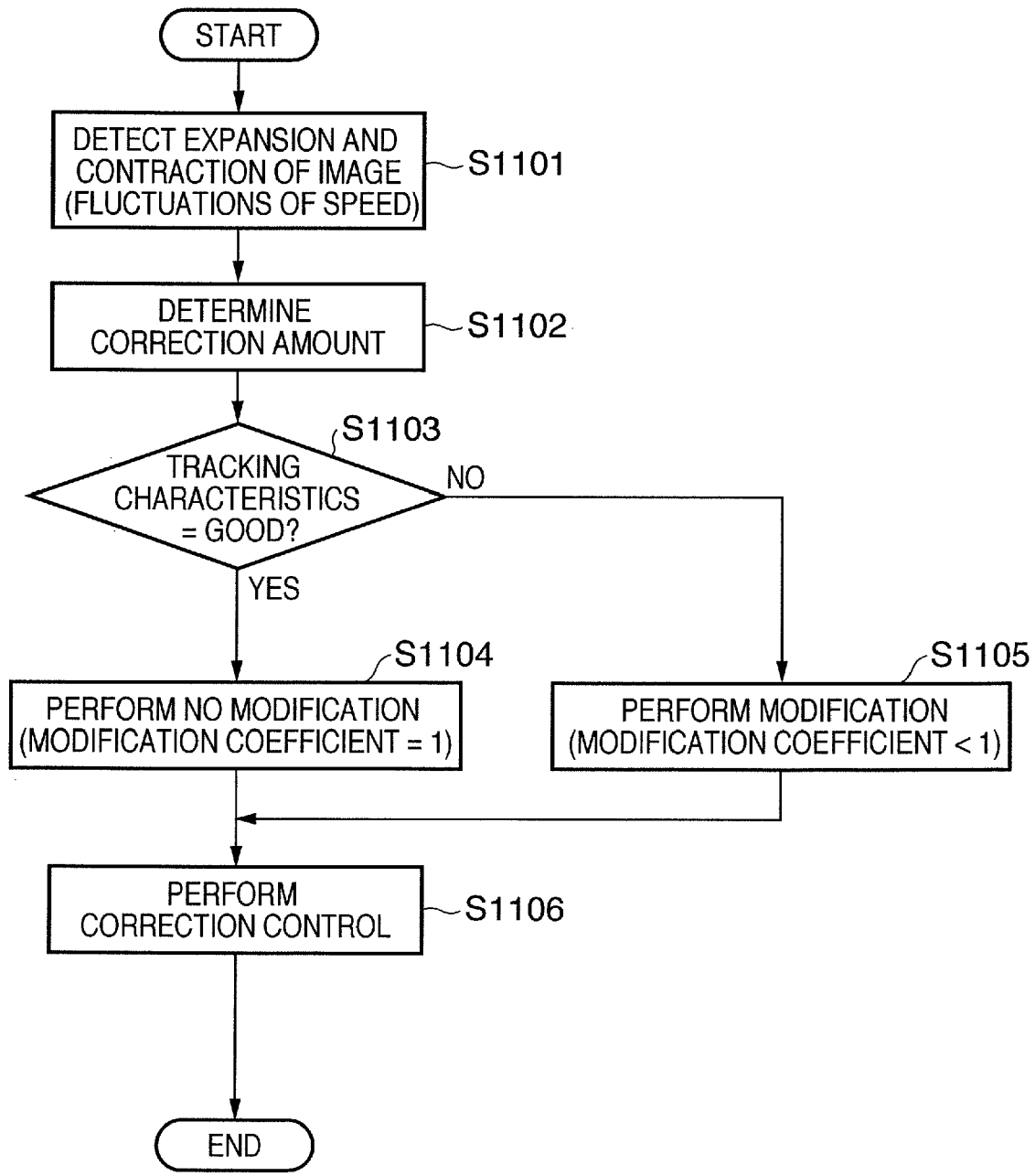
FIG. 11 is an illustrative flowchart showing an image expansion/contraction reduction method according to the first embodiment.

FIG. 11 is an illustrative flowchart showing an image expansion/contraction reduction method according to the first embodiment. In step S1101, the CPU of the control unit 80 forms a pattern 62 on the intermediate transfer belt 31, and causes the photosensor 60 to read the pattern 62 to detect expansion and contraction of an image. For example, the control unit 80 detects periodic fluctuations of the rotation speed of the intermediate transfer belt 31 in the subscanning direction. The image expansion/contraction detection process may be executed as part of a startup sequence executed immediately after the image forming apparatus is turned on. Alternatively, the image expansion/contraction detection process may be executed before/after a print job or when the print count reaches a predetermined value.

In step S1102, the correction amount determination unit 810 of the control unit 80 determines a correction amount to reduce expansion and contraction of an image in accordance with the image expansion/contraction detection result. The correction amount is determined for one round starting from the mark 301 as a reference. For example, the correction amount determination unit 810 creates a correction profile of correction amounts by one round, and stores it in an internal RAM or the like. The correction amount determination unit 810 sequentially reads out the correction amounts and outputs them to the rotation control unit 805 in response to a read request from the rotation control unit 805.

In step S1103, the rotation control unit 805 detects the tracking characteristics of the scanner motor 802 to determine whether the tracking characteristics are good or poor. For example, the tracking characteristic detection unit 807 calculates the difference between the target rotation speed (rotation control signal S3) of the scanner motor 802 and an actual rotation speed detected by the rotation speed sensor 803 and rotation speed detection unit 806. The rotation control unit 805 determines whether the difference exceeds a predetermined threshold. This difference corresponds to a tracking delay. If the difference exceeds the threshold, the tracking characteristics are poor, and the process shifts to step S1105. If the difference is equal to or smaller than the threshold, the tracking characteristics are good, and the process shifts to step S1104.

Then, the tracking characteristic detection process is performed. The first embodiment executes the tracking characteristic detection process immediately after the image expansion/contraction detection process, but the present invention is not limited to this. For example, the tracking characteristic detection process may be done before a print job.

In step S1104, the rotation control unit 805 controls the rotation of the scanner motor 802 in accordance with the determined correction amount. The rotation control unit 805 may use a correction amount modified by multiplying the correction amount by a modification coefficient of 1 or less. The modification coefficient "1" means that no correction amount is substantially modified.

In step S1105, the rotation control unit 805 decreases the correction amount from a normal one and executes rotation control. For example, the rotation control unit 805 multiplies the correction amount by a modification coefficient of less than 1, and executes rotation control using the modified correction amount. The modification coefficient used in step S1104 is smaller than that used in step S1105. This is because further expansion and contraction of an image can be suppressed by setting a correction amount for a scanner motor with poor tracking characteristics to be smaller than that for a scanner motor with good tracking characteristics, as described above.

In step S1106, the rotation control unit 805 controls the rotation speed of the scanner motor 802 in accordance with the correction amount.

According to the first embodiment, the rotation control unit 805 considers the tracking characteristics of the scanner motor 802 to correct the rotation speed of the scanner motor 802 for driving the polygonal mirror 801. This reduces expansion and contraction of an image on a printing material caused by periodic fluctuations of the rotation speed of the intermediate transfer belt 31 bearing a developing material image in the subscanning direction.

In particular, the rotation control unit 805 can suppress further expansion and contraction of an image by modifying the correction amount when the tracking characteristics are poor. For example, the correction amount can be decreased by multiplying the correction amount by a modification coefficient of less than 1, thereby suppressing further expansion and contraction of an image.

When the tracking characteristics are good, the correction amount need not be modified or may be multiplied by a modification coefficient of 1 or less. However, the modification coefficient for good tracking characteristics should be larger than the modification coefficient of less than 1 for poor tracking characteristics. This is because the image expansion/contraction reduction effect can be expected by applying the correction amount as directly as possible.

[Control Flowchart 2]

Figure 12:
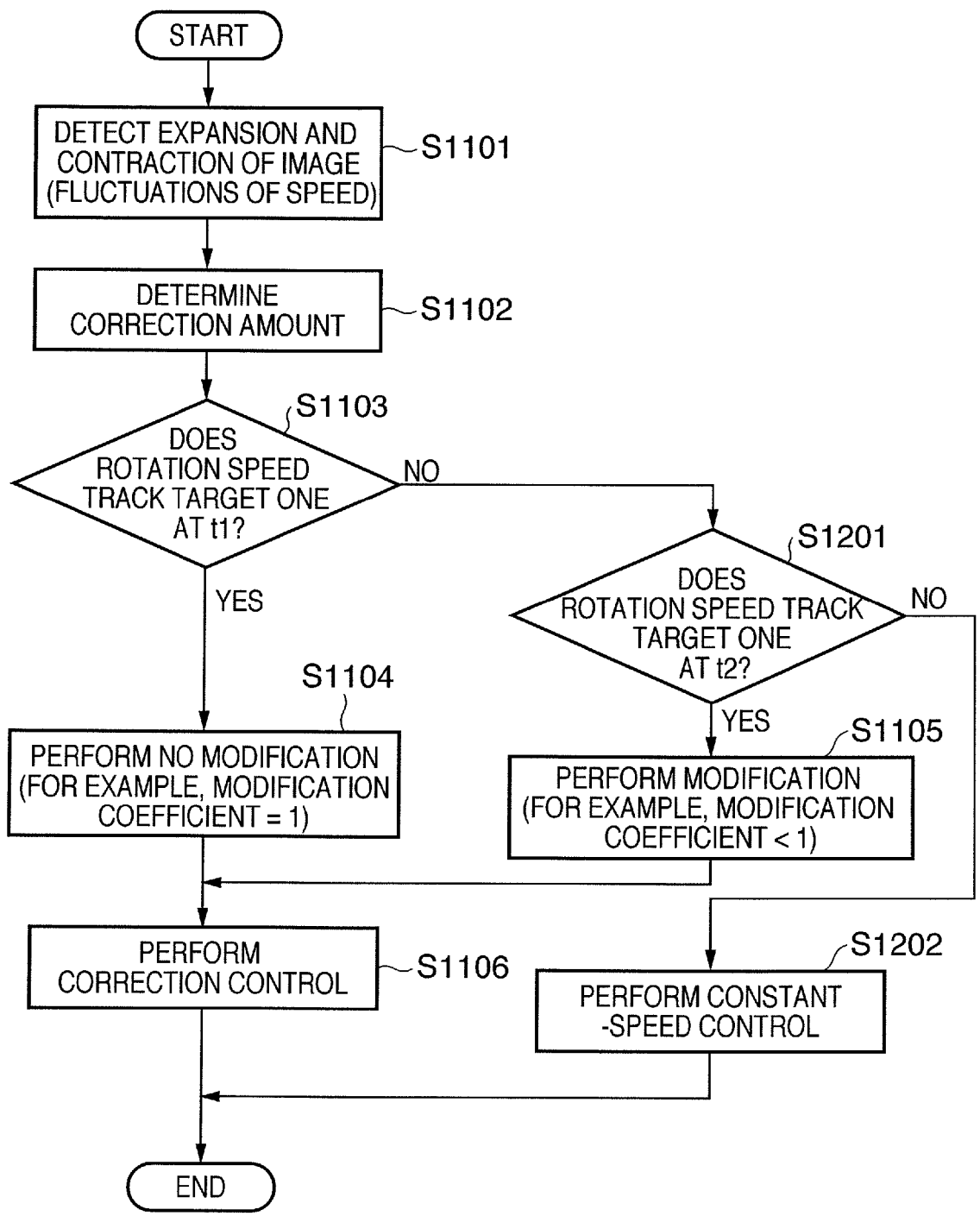
FIG. 12 is an illustrative flowchart showing another image expansion/contraction reduction method according to the first embodiment.

FIG. 12 is an illustrative flowchart showing another image expansion/contraction reduction method according to the first embodiment. The same reference numerals as those described above denote the same processes, and a description thereof will be omitted.

In step S1103, the rotation control unit 805 determines whether the rotation speed of the scanner motor 802 tracks the target rotation speed at predetermined control time t1. If the rotation speed of the scanner motor 802 tracks the target rotation speed, the process shifts to step S1104. If the rotation speed of the scanner motor 802 does not track the target rotation speed, the process shifts to step S1201.

In step S1201, the rotation control unit 805 determines whether the rotation speed of the scanner motor 802 tracks the target rotation speed at predetermined control time t2 later than t1. If the rotation speed of the scanner motor 802 tracks the target rotation speed, the process shifts to step S1105. If the rotation speed of the scanner motor 802 does not track the target rotation speed, the process shifts to step S1202. This determination is based on a predetermined threshold as described above. The threshold is empirically determined in factory shipment so as to preferably reduce expansion and contraction of an image. It is also desirable to empirically determine predetermined control times t1 and t2 in factory shipment so as to preferably reduce expansion and contraction of an image.

In step S1202, the rotation control unit 805 controls the scanner motor 802 to a constant rotation speed without correcting the rotation speed of the scanner motor 802. That is, the rotation control unit 805 does not execute the image expansion/contraction reduction process to correct the rotation speed of the scanner motor 802. In step S1202, the correction amount may also be modified similarly in step S1105.

The modification coefficient in step S1202 should be set smaller than that used in step S1105. This is because when no good tracking characteristic is obtained even at control time t2, the tracking characteristics of the scanner motor are likely to have degraded. In this case, further expansion and contraction of an image can be prevented by inhibiting reflection of the correction amount. The modification coefficient is preferably 0, which means executing no reduction process.

According to the first embodiment, when the tracking delay at the second control time t2 later than the first control time t1 exceeds a threshold, the rotation control unit 805 does not reflect the correction amount in rotation control of the scanner motor 802 (modification coefficient=0). Alternatively, the rotation control unit 805 sets the modification coefficient smaller than that in step S1105. This can suppress further expansion and contraction of an image even if the tracking characteristics greatly degrade.

The first embodiment sets the two control times t1 and t2, and the tracking characteristic detection unit 807 or rotation control unit 805 monitors tracking characteristics, but the present invention is not limited to this. That is, one or three or more control times may be set. When one control time is set, the rotation control unit 805 desirably determines, on the basis of the result of monitoring tracking characteristics, whether to correct rotation control of the scanner motor. If three or more control times are set, the rotation control unit 805 may set the image expansion/contraction correction amount in accordance with the number of control times when it is determined that the rotation speed tracks the target one or the order of control times when it is confirmed that the rotation speed tracks the target one.

Second Embodiment

The first embodiment is directed to reduce expansion and contraction of an image by modifying a correction amount corresponding to the tracking characteristics of the scanner motor 802. The first embodiment adopts a method of modifying the correction amount. Alternatively, the timing to apply the correction amount may be modified because the tracking delay appears as a time-base value.

The second embodiment will describe a method of adjusting the control timing of the rotation speed of a scanner motor 802 in accordance with its tracking characteristics.

Figure 13:
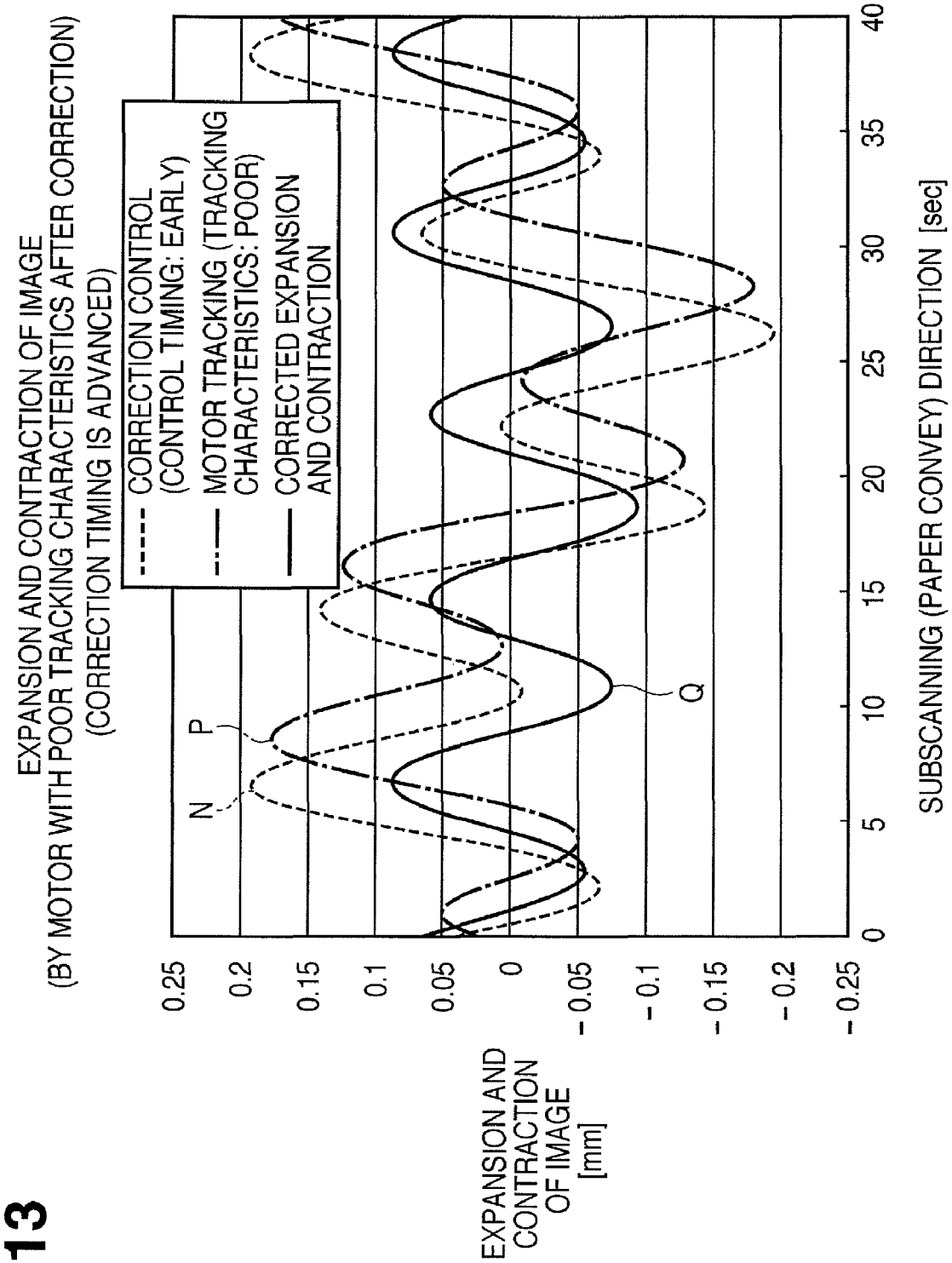
FIG. 13 is a graph for explaining the concept of an image expansion/contraction reduction method according to the second embodiment.

FIG. 13 is a graph for explaining the concept of an image expansion/contraction reduction method according to the second embodiment. Broken line N represents a normal correction amount. Chain line P represents a correction amount in a case of advancing the control timing when the correction amount is applied to a scanner motor with poor tracking characteristics. Chain line P will also be referred to as correction amount P. The control timing when tracking characteristics are poor is earlier by predetermined seconds (e.g., 1 sec) than the control timing when tracking characteristics are good. The predetermined seconds are desirably determined in accordance with the tracking delay.

Solid line Q represents expansion and contraction of an image when correction amount P is applied. After adding correction amount P to image expansion/contraction C before correction in FIG. 5, image expansion/contraction changes to one represented by solid line Q. Image expansion/contraction C shown in FIG. 5 occurs by about ±0.2 mm. By applying the second embodiment, image expansion/contraction reduces to ±0.1 mm even in the use of a scanner motor with poor tracking characteristics, as represented by solid line Q in FIG. 13. No image expansion/contraction worsens, unlike solid line J in FIG. 7.

Figure 14:
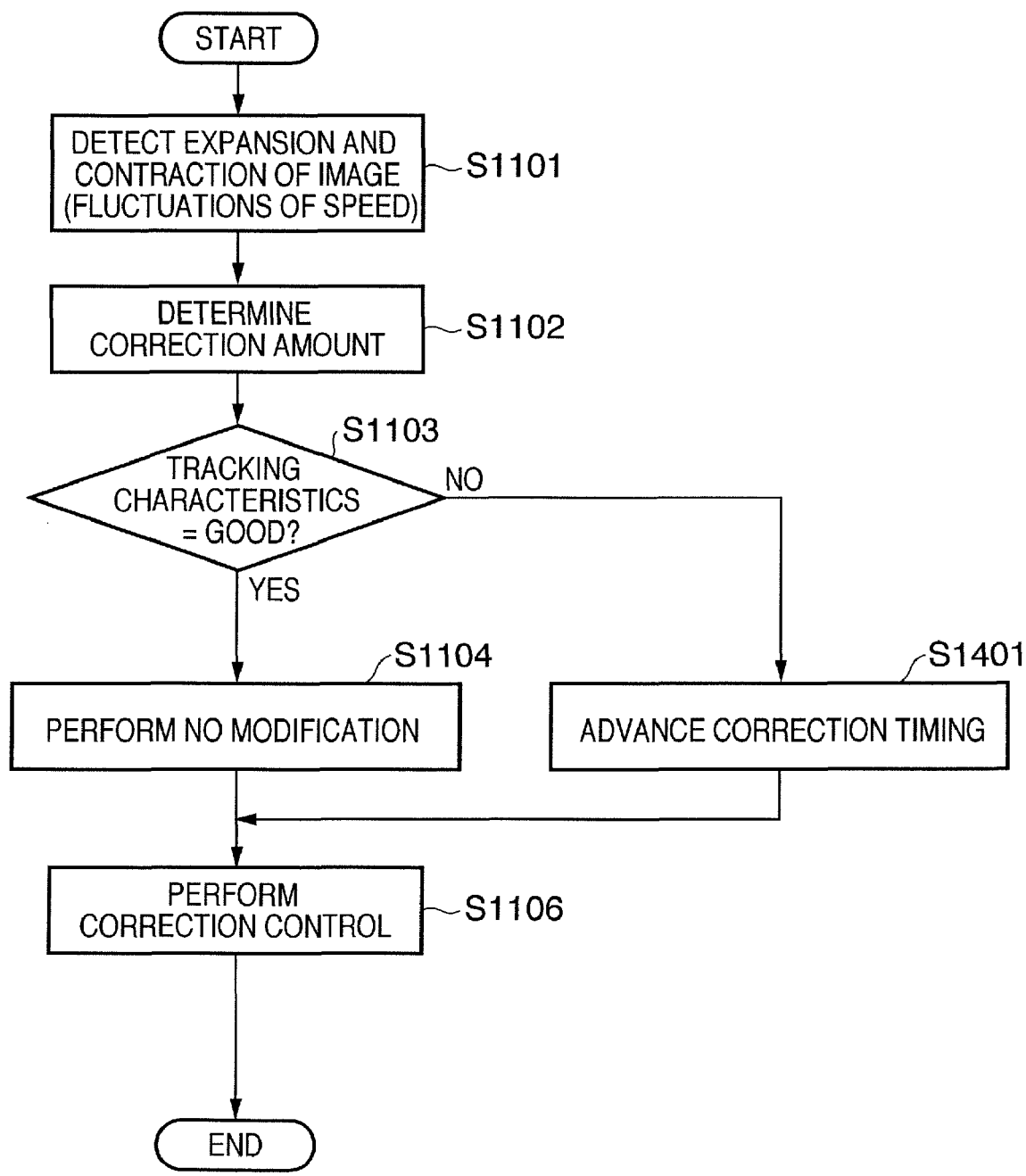
FIG. 14 is an illustrative flowchart showing the image expansion/contraction reduction method according to the second embodiment.

FIG. 14 is an illustrative flowchart showing the image expansion/contraction reduction method according to the second embodiment. The same reference numerals as those described above denote the same processes, and a description thereof will be omitted.

If it is determined in step S1103 that the tracking characteristics are poor, the process shifts to step S1401. In step S1401, a rotation control unit 805 advances, by a predetermined time, the timing (control timing) when the correction amount is applied. The rotation control unit 805 desirably determines the predetermined time to cancel the tracking delay. For example, when the tracking delay is 1 sec, the predetermined time is also 1 sec. Thereafter, the process shifts to step S1106, and the rotation control unit 805 controls the rotation speed of the scanner motor 802 while applying the correction amount at the timing advanced by the predetermined time.

The second embodiment can preferably reduce expansion and contraction of an image by advancing, in accordance with the tracking delay, the timing when the correction amount is applied to the scanner motor 802.

Third Embodiment

Figure 15:
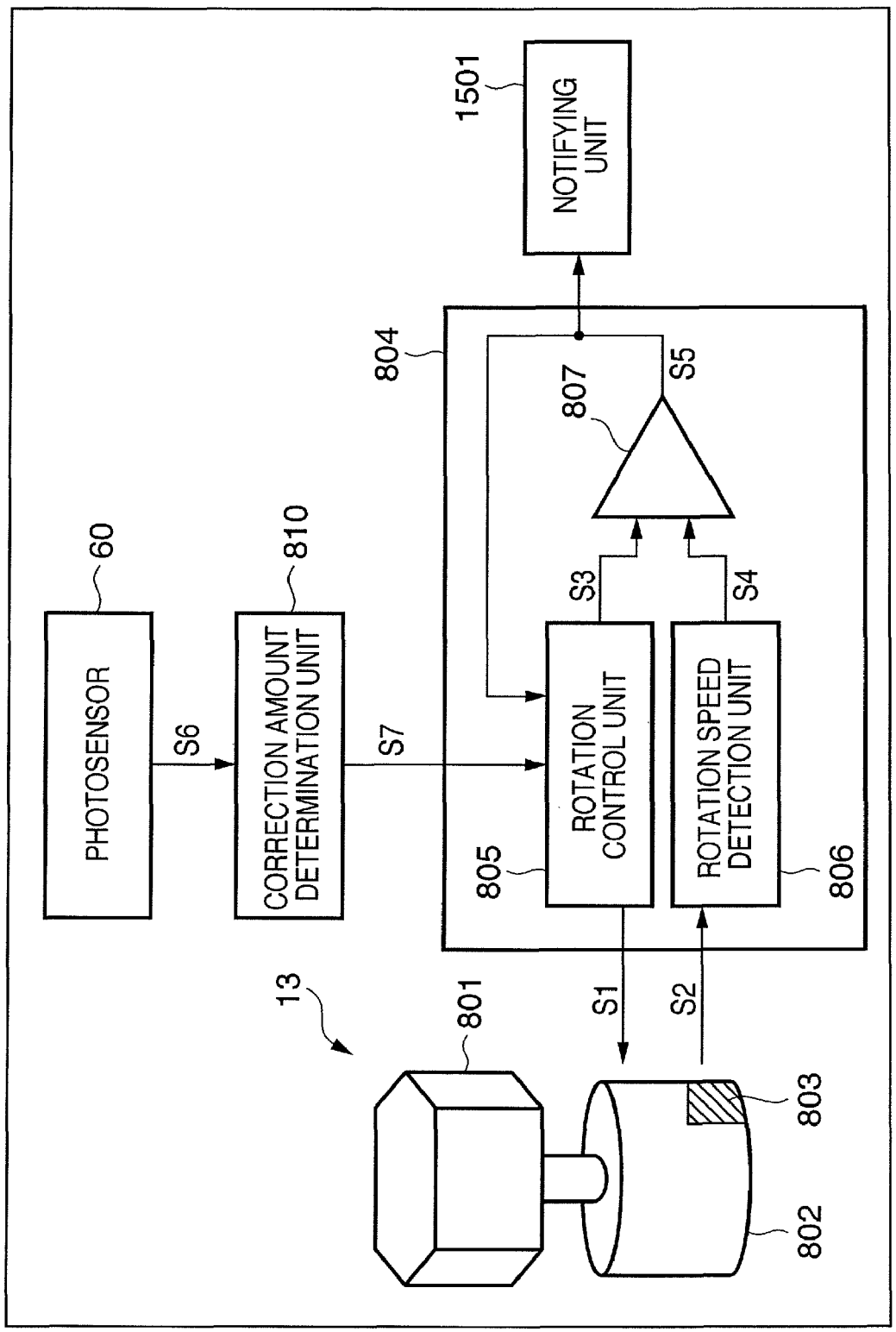
FIG. 15 is a view for explaining a scanner motor control circuit in a control unit.

FIG. 15 is a view for explaining a scanner motor control circuit in a control unit. A notifying unit 1501 is added, unlike FIG. 8. The notifying unit 1501 outputs a predetermined notification to an operator when a tracking delay is detected. The notifying unit 1501 is, e.g., a display device, audio output device, or e-mail sending device.

Figure 16:
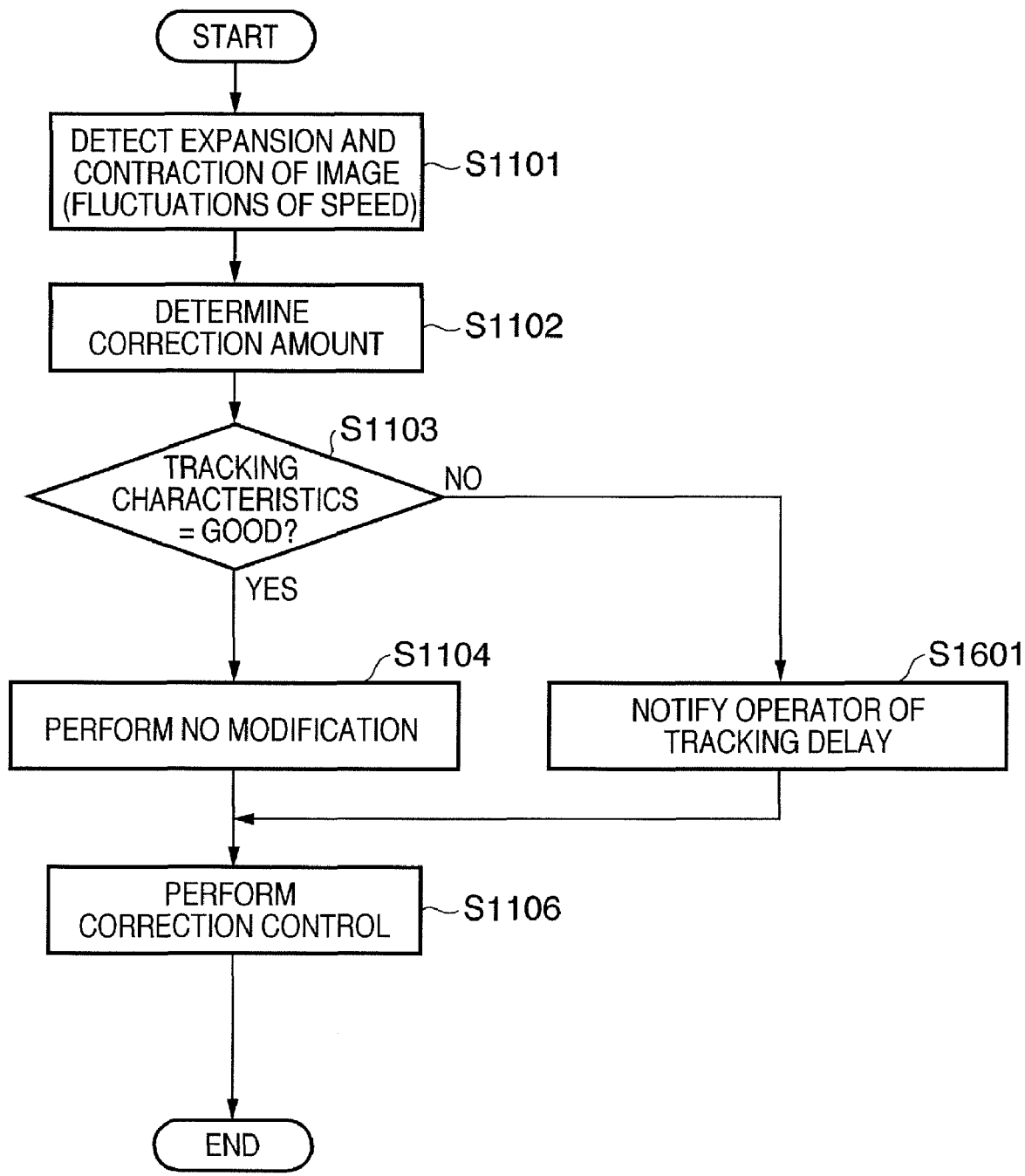
FIG. 16 is a flowchart for explaining a notifying process when a tracking delay occurs according to the third embodiment.

FIG. 16 is a flowchart for explaining a notifying process when a tracking delay occurs according to the third embodiment. The same reference numerals as those described above denote the same processes, and a description thereof will be omitted.

If it is determined in step S1103 that the tracking characteristics are poor, the process shifts to step S1601. In step S1601, the notifying unit 1501 outputs a predetermined notification. An example of the notification is "the tracking characteristics of the scanner motor are becoming poor." or "please replace the scanner motor."

The notifying process may be executed instead of or in parallel with the modifying process (S1105 or S1202). This is because when the modifying process is necessary, a scanner motor 802 comes to the end of its service life. It is desirable to call operator's attention in advance.

According to the third embodiment, when the tracking delay of the scanner motor 802 occurs, the notifying unit 1501 can notify the operator of the tracking delay to prompt him to replace the scanner motor 802.

Other Embodiment

Various embodiments have been described above. Needless to say, units and steps described in the embodiments can be arbitrarily combined unless any contradiction occurs. Examples of the combination are described in the scope of the claims.

The embodiments detect expansion and contraction of an image by reading the pattern 62 formed on the intermediate transfer belt 31, but the present invention is not limited to this. For example, the image expansion/contraction amount may be detected by forming the pattern 62 on the photosensitive drum 11. In this case, the photosensor 60 is arranged near the photosensitive drum 11.

The pattern 62 need not always be used as long as expansion and contraction of an image in the subscanning direction are detectable. For example, a movable shaft which rotates together with the rotation and carrier unit such as the photosensitive drum 11 or intermediate transfer belt 31, and a rotation speed sensor such as an encoder may be used to detect the rotation speed of the rotation and carrier unit.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-115009, filed Apr. 18, 2006, which is hereby incorporated by reference herein in its entirety.

What is claimed is:

1. An image forming apparatus comprising:
    a scanner motor;
    a rotary polygonal mirror which is driven by said scanner motor to rotate, and reflects a modulated beam emitted from a light source by a plurality of reflection surfaces;
    a rotational carrier unit which carries an image formed on the basis of a laser beam reflected by said rotary polygonal mirror;
    a first speed detection unit which detects a rotation speed of said rotational carrier unit;
    a tracking characteristic detection unit which detects a tracking delay of said scanner motor from a target rotation speed; and
    a control unit which controls, on the basis of the rotation speed detected by said speed detection unit and the tracking delay detected by said tracking characteristic detection unit, a rotation speed of said scanner motor that drives said rotary polygonal mirror;
    wherein said control unit includes:
    a determination unit which determines, on the basis of the rotation speed detected by said first speed detection unit and the tracking delay detected by said tracking characteristic detection unit, the rotation speed of said scanner motor that drives said rotary polygonal mirror, wherein the determination unit determines the rotation speed of said scanner motor by determining a correction amount to be applied with the rotation speed of said scanner motor such that a first correction amount is smaller than a second correction amount, the first correction amount being used for correcting a rotation speed of said scanner motor when the tracking delay is equal to or longer than a predetermined delay, and the second correction amount being used for correcting a rotation speed of said scanner motor when the tracking delay is shorter than the predetermined delay; and
    a modification unit which modifies the rotation speed determined by said determination unit.

2. The apparatus according to claim 1,
    wherein the determination unit determines the first correction amount by multiplying the second correction amount by a modification coefficient being less than 1.

3. The apparatus according to claim 2,
    wherein the first correction amount is obtained by multiplying the second correction amount by 0.5.

4. The apparatus according to claim 1 further comprising:
    a rotation control unit which outputs a rotation control signal to said scanner motor; and
    a second speed detection unit which detects the rotation speed of said scanner motor,
    wherein the tracking characteristic detection unit detects the tracking delay which is a time interval from when the rotation control signal is outputted until when the rotation speed of said scanner motor is controlled to reach a rotation speed corresponding to the rotation control signal.

* * * * *